(12) United States Patent
Ganesh et al.

(10) Patent No.: US 9,363,636 B2
(45) Date of Patent: Jun. 7, 2016

(54) SENDING GEOFENCE-RELATED HEURISTICS TO MULTIPLE SEPARATE HARDWARE COMPONENTS OF MOBILE DEVICES

(71) Applicant: Google Inc., Mountain View, CA (US)

(72) Inventors: Jaikumar Ganesh, San Francisco, CA (US); Mohammed Waleed Kadous, Santa Clara, CA (US); Zhentao Sun, Sunnyvale, CA (US); Laurent Tu, Shanghai (CN)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 14/019,388

(22) Filed: Sep. 5, 2013

(65) Prior Publication Data

US 2015/0065161 A1 Mar. 5, 2015

(51) Int. Cl.
*H04W 4/02* (2009.01)

(52) U.S. Cl.
CPC .............. *H04W 4/021* (2013.01); *H04W 4/027* (2013.01)

(58) Field of Classification Search
CPC .......... H04W 4/021; H04W 4/22; H04W 4/08
USPC .......... 455/456.1, 456.6, 404.2, 456.3, 404.1; 340/989, 992, 993
See application file for complete search history.

(56) References Cited

U.S. PATENT DOCUMENTS

| | | | |
|---|---|---|---|
| 7,633,389 B2 | 12/2009 | Mantovani et al. | |
| 9,188,451 B2 * | 11/2015 | Magnusson | G01C 21/30 |
| 2006/0079201 A1 | 4/2006 | Chung et al. | |
| 2008/0129490 A1 * | 6/2008 | Linville et al. | 340/539.13 |
| 2008/0280624 A1 | 11/2008 | Wrappe | |
| 2008/0305808 A1 | 12/2008 | Chan et al. | |
| 2009/0058720 A1 | 3/2009 | Shaw et al. | |
| 2009/0312032 A1 | 12/2009 | Bornstein et al. | |
| 2010/0016022 A1 | 1/2010 | Liu et al. | |
| 2010/0255856 A1 | 10/2010 | Kansal et al. | |
| 2011/0196571 A1 * | 8/2011 | Foladare et al. | 701/33 |
| 2011/0250901 A1 | 10/2011 | Grainger et al. | |
| 2011/0312349 A1 * | 12/2011 | Forutanpour | G06F 1/1626 455/466 |
| 2013/0091452 A1 * | 4/2013 | Sorden et al. | 715/771 |
| 2013/0151622 A1 * | 6/2013 | Goel et al. | 709/205 |
| 2013/0225196 A1 * | 8/2013 | James et al. | 455/456.1 |

(Continued)

OTHER PUBLICATIONS

N. Pelly, "GIT Report: Improve geofencing: throttle location updates with distance to fence", Jul. 11, 2012.

(Continued)

*Primary Examiner* — Cong Tran
(74) *Attorney, Agent, or Firm* — McDonnell Boehnen Hulbert & Berghoff LLP

(57) ABSTRACT

Methods and apparatus are directed to geofencing-related heuristics for computing devices. A computing device with a plurality of sensors can receive a plurality of heuristics. Each heuristic can be configured to generate command(s) for the sensors based on one or more heuristic inputs. The heuristic input(s) can include an input related to a geofence. The computing device can receive a plurality of signals from the sensors. The computing device can determine, based on the plurality of signals, an activity class for the computing device. The activity class can specify an activity associated with the computing device. The computing device can select a heuristic from the plurality of heuristics at least based on the activity class. The computing device can execute the selected heuristic to generate the command(s) for the sensors.

20 Claims, 8 Drawing Sheets

(56) References Cited

U.S. PATENT DOCUMENTS

| | | | |
|---|---|---|---|
| 2014/0100793 A1* | 4/2014 | Fales | 702/22 |
| 2014/0187264 A1* | 7/2014 | Min | H04W 48/16 455/456.2 |
| 2014/0206328 A1* | 7/2014 | Varoglu | H04W 4/028 455/418 |
| 2014/0351559 A1* | 11/2014 | Lautner | G06F 15/80 712/30 |
| 2015/0223022 A1* | 8/2015 | Kumar | H04W 4/021 455/456.1 |

OTHER PUBLICATIONS

Wikimedia Foundation, Inc., "Geo-fence", Wikipedia, May 21, 2013.

* cited by examiner

300A

300B

300C

SENDING GEOFENCE-RELATED HEURISTICS TO MULTIPLE SEPARATE HARDWARE COMPONENTS OF MOBILE DEVICES

BACKGROUND

Unless otherwise indicated herein, the materials described in this section are not prior art to the claims in this application and are not admitted to be prior art by inclusion in this section.

A geofence is a virtual region specified in relation to a corresponding geographical region. For example, a geofence that encircles at least part of a sports arena can be specified with a latitude and longitude pair of (lat, long) and a given radius; e.g., 100 meters. In other examples, polygons, such as triangles or rectangles, or other shapes can be used to specify a geofence.

A computing device, such as a mobile device, can authorize geofencing applications to monitor particular geofences. The example computing device can then receive message(s) when the device enters into an authorized geofence and/or exits the authorized geofence. Some geofences can include other geofences; e.g., the above-mentioned geofence for the sports arena can contain geofence(s) for points of interest, offices, facilities, and shops within the sports arena geofence, just as the physical sports arena can contain physical regions for the aforementioned points of interest, offices, facilities, and shops. Continuing this example, as the device moves into, around, and through the sports arena, the device can receive message(s) when entering the sports arena geofence, when subsequently entering into geofences within the sports arena geofence, and perhaps when leaving the sports arena geofence.

SUMMARY

In one aspect, a method is provided. A computing device receives a plurality of heuristics. The computing device has a plurality of sensors. Each heuristic of the plurality of heuristics is configured to generate one or more commands to one or more sensors of the plurality of sensors based on one or more heuristic inputs. The one or more heuristic inputs include an input related to a geofence. The computing device receives a plurality of signals from the plurality of sensors. The computing device determines, based on the plurality of signals, an activity class for the computing device. The activity class specifies an activity associated with the computing device. The computing device selects a heuristic from the plurality of heuristics at least based on the activity class. The computing device executes the selected heuristic to generate the one or more commands to the one or more sensors.

In another aspect, a computing device is provided. The computing device includes a plurality of sensors, a processor, and a non-transitory computer-readable storage medium. The non-transitory computer-readable storage medium has instructions stored thereon that, in response to execution by the processor, cause the computing device to perform functions. The functions include: receiving a plurality of heuristics, where each heuristic of the plurality of heuristics is configured to generate one or more commands to one or more sensors of the plurality of sensors based on one or more heuristic inputs, and where the one or more heuristic inputs includes an input related to a geofence; receiving a plurality of signals from the plurality of sensors; determining, based on the plurality of signals, an activity class, where the activity class specifies an activity associated with the computing device; selecting a heuristic from the plurality of heuristics at least based on the activity class; and executing the selected heuristic to generate the one or more commands to the one or more sensors.

In another aspect, an apparatus is provided. The apparatus includes a non-transitory computer-readable storage medium having instructions stored thereon that, when executed by a computing device, cause the apparatus to perform functions. The functions include: receiving a plurality of heuristics, where each heuristic of the plurality of heuristics is configured to generate one or more commands to one or more sensors of the plurality of sensors based on one or more heuristic inputs, and where the one or more heuristic inputs includes an input related to a geofence; receiving a plurality of signals from the plurality of sensors; determining, based on the plurality of signals, an activity class, where the activity class specifies an activity associated with the apparatus; selecting a heuristic from the plurality of heuristics at least based on the activity class; and executing the selected heuristic to generate the one or more commands to the one or more sensors.

DETAILED DESCRIPTION

Overview

Figure 1:
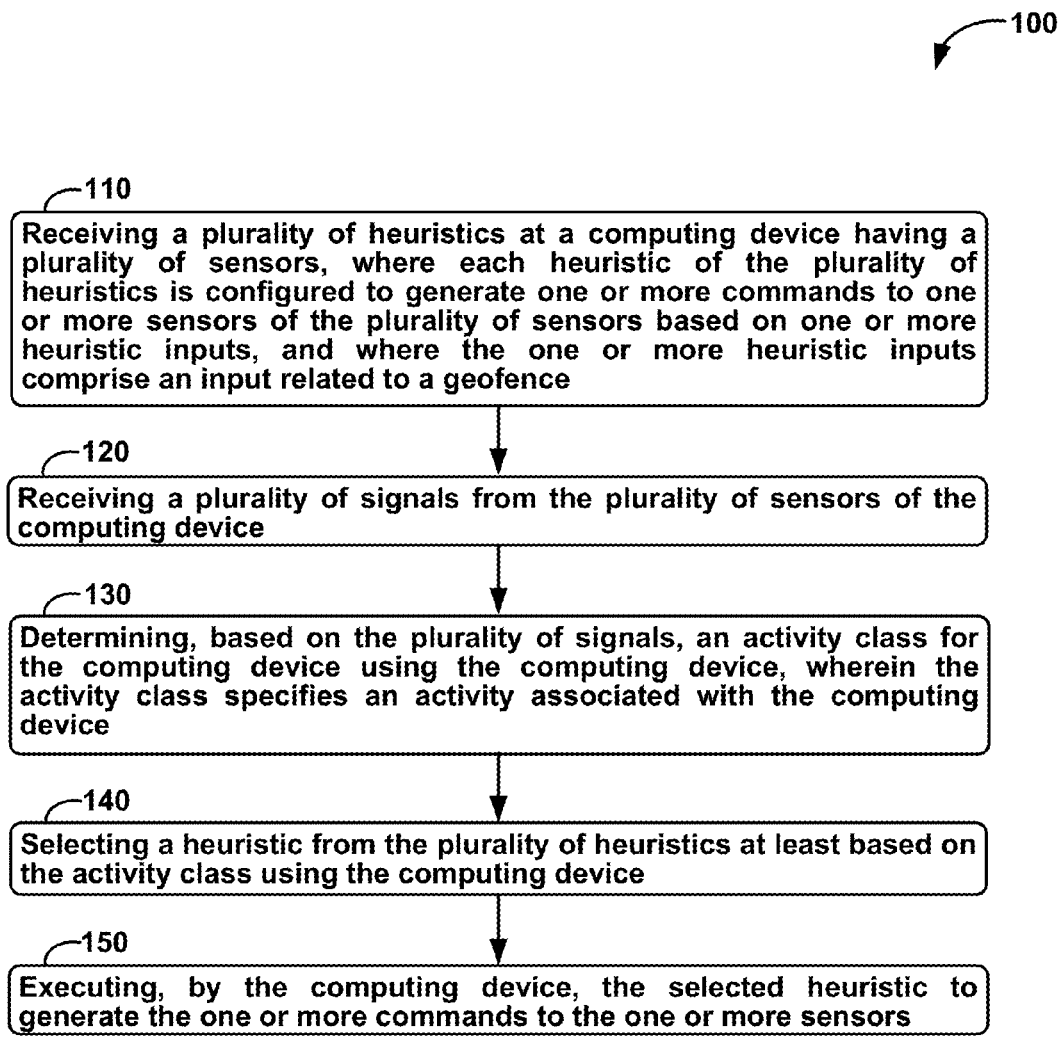
FIG. 1 is a flow chart of a method, in accordance with an example embodiment.

Disclosed herein are techniques for determining and applying heuristics related to geofencing for computing devices, such as mobile devices. One approach to determining whether a mobile device has entered into or exited from an area associated with a geofence is to determine the location of the mobile device and then determine if the location of the mobile device is within the perimeter, or boundary, of the geofence. If the mobile device was not previously within the geofence and now the location of the mobile device is within the geofence, the mobile device is entering into the geofence. However, if the mobile device was previously within the geofence and now the location of the mobile device is outside the geofence, the mobile device has exited from the geofence. If the mobile device has authorized geofencing, the mobile device can generate a message upon entering into the geofence and/or exiting from the geofence.

The above approach for geofencing involves accurately determining a location of the mobile device. Determining a location of the mobile device can be accomplished using several techniques. Example techniques include, but are not limited to, determining the location based on: Global Positioning System (GPS) satellites, dead reckoning from a known location, input from a user of the mobile device, based on information in the environment (e.g., street and highway signs), triangulation of network signals, use measurements from gyroscope(s) and accelerometer(s), detection of proximity beacons (e.g. Bluetooth users), and combinations of these techniques. Other techniques are possible as well.

Many techniques for determining location involve the use of one or more sensors on the mobile device. Examples of these sensors include, but are not limited to: GPS sensors, accelerometers, gyroscopes, network interfaces configured to provide signal strength information, user input devices, and cameras. Each of these sensors can have differing power requirements and be used to determine a location of the mobile device to differing degrees of accuracy. Also, in practice, different mobile devices can include different types of sensors, and in some cases, not all sensors on the mobile device may be operational.

Mobile devices are used in the context of different activities, which can be classified into activity classes. For example, consider a person who takes his or her phone everywhere during one working day. First, the mobile device is essentially stationary at home while the person prepares for his or her workday. Then, as the person travels to work, the mobile device is walking or being carried by a vehicle to the worksite. Depending on the person's tasks, the mobile device may then be essentially stationary at an office, walk or run around a job site, and/or travel from place to place in a vehicle. Then, after work, the mobile device may be taken home and remain stationary while the person sleeps. In this example, a classification of the activities of the mobile phone can include: (a) being stationary, (b) walking, (c) running, or (d) vehicular motion. Other activity classes are possible as well.

In the context of geofencing, heuristic approaches can be used to select sensors to determine a mobile device's location. The heuristics can receive a number of inputs, including, but not limited to: activity class input(s) (e.g., an activity class, how long the activity class has been assigned), input(s) about geofences (e.g., geofence-specification data, nearest location to a geofence, number of authorized geofences, locations related to the geofence, a number of geofences), velocity (speed and/or direction), and/or acceleration information about the mobile device, information about the mobile device, such as battery power available, and network-related information, such as signal-strength information.

Based on these inputs, the mobile device can select a heuristic from among a number of heuristics. For example, if the activity class of the mobile device indicates that that mobile device is stationary and the mobile device is not near a geofence, a heuristic can be selected that does not check location, but checks for movement of the mobile device, as the location is not changing but the heuristic may need to change if the mobile device begins to move.

As another example, if the activity class indicates that mobile device is associated with walking and the mobile device is within a predetermined distance (e.g., 100 meters or yards) of a geofence boundary, a heuristic can be selected that checks location frequently and using sensor(s) that provide accurate location information can be selected, as the mobile device may soon be at a geofence boundary. As yet another example, if the activity class indicates that mobile device is associated with vehicular movement and the mobile device is not within another predetermined distance (e.g., 1 mile or kilometer) of a geofence boundary, a heuristic can be selected that checks location frequently and using sensor(s) that use low power to provide location information can be selected, as the location is changing frequently but is not apparently near a geofence boundary. Many other examples are possible as well.

These techniques can improve geofence adoption by enabling heuristic selection of sensors to determine location based on a number of techniques. Some of these techniques can save power and utilize fewer resources of the mobile device than frequent location determination using GPS. Thus, by selecting and using heuristics for controlling geofencing-related sensors, the geofencing application can provide accurate results and preserve battery power and other resources of the mobile device.

Example Operations

FIG. 1 is a flow chart of method 100, in accordance with an example embodiment. Method 100 begins at block 110, where a mobile device, e.g., mobile device 210 described below, can receive a plurality of heuristics. The mobile device can have a plurality of sensors. Each heuristic of the plurality of heuristics can be configured to generate one or more commands to one or more sensors of the plurality of sensors based on one or more heuristic inputs. The one or more heuristic inputs can include an input related to a geofence. The input related to the geofence can include, but is not limited to: a location related to the geofence, information about a geometry of the geofence (e.g., a radius of the geofence for a circular geofence, corner points for a rectangular geofence, etc.), a size of the geofence, a distance to a geofence, a number of geofences, and an indication of whether the mobile device has authorized a geofence.

In some embodiments, the plurality of sensors can include a location sensor and a network-signal receiver. In particular embodiments, the plurality of heuristic inputs can include one or more locations associated with the mobile device received as input from the location sensor. The plurality of heuristic inputs can include one or more signal-strength values associated with the mobile device received as input from the network-signal receiver.

At block 120, the mobile device can receive a plurality of signals from the plurality of sensors.

At block 130, the mobile device can determine, based on the plurality of signals, an activity class for the mobile device. The activity class can specify an activity associated with the mobile device.

In some embodiments, the plurality of heuristic inputs can include one or more locations associated with the mobile device. In these embodiments, determining the activity class for the mobile device can include determining the activity class for the mobile device based on the one or more locations. In particular embodiments, the plurality of heuristic inputs further can include one or more velocities associated with the mobile device. In these embodiments, determining the activity class for the mobile device can include determining the activity class for the mobile device based on the one or more locations and the one or more velocities.

In more particular embodiments, the one or more locations associated with the mobile device can include a first location. In these embodiments, determining the activity class for the mobile device can include determining that the activity class for the mobile device is a stationary activity class when each of one or more locations differs from the first location by less than a first predetermined distance for at least a first duration of time.

In still more particular embodiments, determining the activity class for the mobile device can include determining that the activity class for the mobile device is a walking activity class when at least some of one or more locations differ from the first location by more than the first predetermined distance but less than a second predetermined distance during at least the first duration of time. In these embodiments, executing the selected heuristic to generate the one or more commands to the one or more sensors can include: determining whether the activity class is the stationary activity class and after determining that the activity class is the stationary activity class, instructing the location sensor to power off. In these embodiments, executing the selected heuristic to generate the one or more commands to the one or more sensors can include: determining whether the activity class is the walking activity class and after determining that the activity class is the stationary activity class, instructing the location sensor to power on.

In other more particular embodiments, the one or more velocities associated with the mobile device can include a first velocity. Then, determining the activity class for the mobile device can include determining that the activity class for the mobile device is a stationary activity class when an absolute value of each of the one or more velocities is less than a first predetermined velocity for at least a first duration of time. In these embodiments, determining the activity class for the mobile device can include determining that the activity class for the mobile device is a walking activity class when at least one of the one or more velocities is greater than the first predetermined velocity and less than a second predetermined velocity during the first duration of time and wherein the second predetermined velocity exceeds the first predetermined velocity.

In still other more particular embodiments, the one or more signal-strength values associated with the mobile device can include a first signal-strength value. Determining the activity class for the mobile device can include determining that the activity class for the mobile device is a stationary activity class when each signal-strength value of the one or more signal-strength values differs from the first signal-strength value by less than a first predetermined signal-strength amount for at least a first duration of time. In these embodiments, determining the activity class for the mobile device can include determining that the activity class for the mobile device is a walking activity class when at least one of the one or more signal-strength values differs from the first signal-strength values by more than the first predetermined signal-strength amount during the first duration of time.

At block 140, the mobile device can select a heuristic from the plurality of heuristics at least based on the activity class.

At block 150, the mobile device can execute the selected heuristic to generate the one or more commands to the one or more sensors. In some embodiments, a computing device, such as the mobile device can include an application processor and a baseband processor. In these embodiments the application processor can be configured to execute at least a geofencing application and the baseband processor can be configured to manage the plurality of sensors. Then, executing the selected heuristic to generate the one or more commands to the one or more sensors can include executing the selected heuristic using the baseband processor. In other embodiments, executing the selected heuristic to generate the one or more commands to the one or more sensors can include executing the selected heuristic for the geofencing application using the application processor. In still other embodiments, executing the selected heuristic to generate the one or more commands to the one or more sensors can include executing the selected heuristic for the geofencing application using both the application processor and the baseband processor.

Example Geofences

Figure 2A:
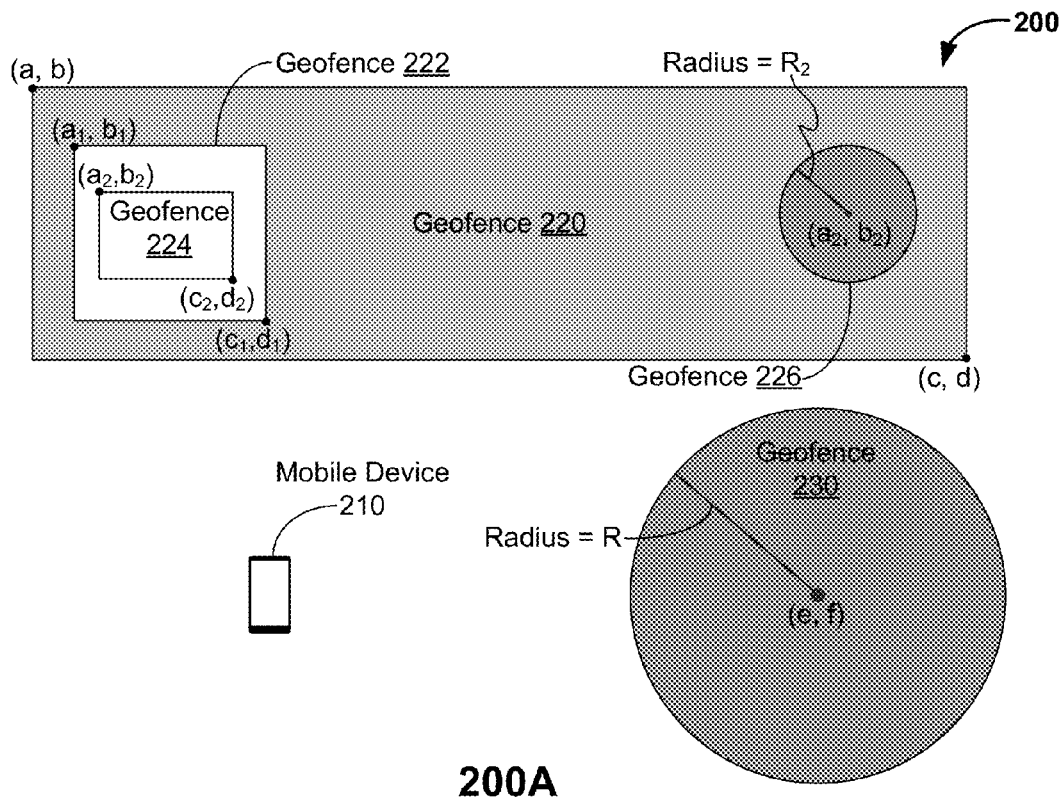
FIG. 2A depicts a geofencing scenario for a mobile device, in accordance with an example embodiment.
Figure 2A:
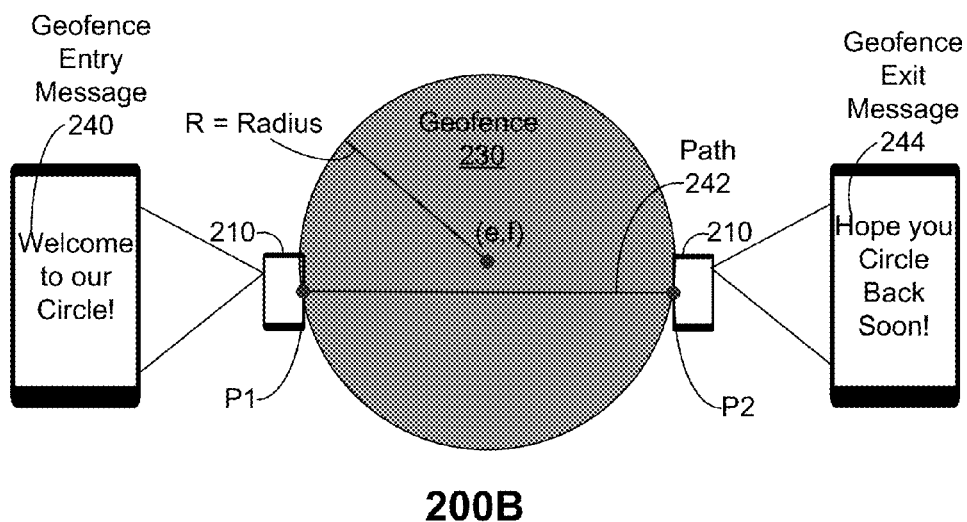

FIG. 2A depicts a geofencing scenario 200 for a mobile device 210, in accordance with an example embodiment. At 200A of scenario 200, mobile device 210 is relatively close to five geofences: geofences 220, 222, 224, 226, and 230. Geofences 220, 222, and 224 are shaped as rectangles, and specified in terms of upper-left-hand corner and lower-left-hand corner coordinates. For example, geofence 220 has upper-left-hand corner coordinates of (a, b) and lower-left-hand corner coordinates of (c, d). By this specification, geofence 220 includes all points whose x coordinates range from a to c and whose y coordinates range from b to d.

In some cases, geofences can be nested or included within other geofences. For example, FIG. 2A shows geofences 222 and 226 within geofence 220, and geofence 224 within geofence 222.

Other geometries than rectangles can be used for geofences. FIG. 2A at 200A shows circular geofences 226 and 230 each specified by a respective center point and radius. For examples, geofence 226 is specified with a center point of $(a_2, b_2)$ and a radius of $R_2$, and geofence 230 is specified with a center point of (e, f) and a radius of R.

At 200B of FIG. 2A, mobile device 210 enters geofence 230 at point P1, travels along path 242, and exits geofence 230 at point P2. Mobile device 210 can first determine entry within geofence 230 by determining its current location, determining a difference D between the current location and the center point (e, f) of geofence 230, and comparing the difference D to a function f(R) of the radius R of geofence 230.

For example, let (x, y) be the current position of mobile device 210. Then, if the difference D between the current position and the center point of geofence 230 is determined as $D=\sqrt{(x-e)^2+(y-f)^2}$, then the difference D can be compared to the radius R of geofence 230; i.e., f(R)=R. In another example, the difference D can be determined as $D=(x-e)^2+(y-f)^2$ with $f(R)=R^2$.

Then, if D is less than f(R), mobile device 210 is within the boundary of geofence 230; otherwise, D≥f(R) and mobile device 210 is not within the boundary of geofence 230.

To determine entry into the geofence, mobile device 210 can retain two values for each geofence: a previous entry state and a current entry state. The previous and current entry states can both be initialized to "Not entered". Then, mobile device 210 can determine whether it is within geofence 230 using the techniques mentioned above. If mobile device 210 is now within geofence 230; e.g., has reached point P1 along path 242; then the current entry state can be set to "Entered". Upon setting the current entry state to "Entered", mobile device 210 can determine whether the previous entry state is set to "Not entered". When the current entry state is "Entered" and the previous entry state is set to "Not entered", then mobile device 210 can determine that mobile device 210 has just entered into geofence 230. After comparing the previous entry state with "Not entered", the current entry state can be copied to the previous entry state.

Upon entry into geofence 230, a geofence entry message can be generated. FIG. 2A shows that mobile device 210 enters geofence 230 at point P1 and so geofence entry message 240 of "Welcome to our Circle!" is generated for display on mobile device 210.

A similar technique can be used to determine when mobile device 210 exits geofence 230; e.g., mobile device 210 can determine that it has exited geofence 230 when the previous entry state is "Entered" and the current entry state is "Not Entered". Upon exit from geofence 230, a geofence exit message can be generated. FIG. 2A shows that mobile device 210 enters geofence 230 at point P2 and so geofence exit message 244 of "Hope you Circle Back Soon!" is generated for display by mobile device 210. In some embodiments, a geofencing application executing on mobile device 210 can be used to generate geofencing messages; e.g., geofence entry message 240 and/or geofence exit message 244.

Example Activity Classes for Mobile Devices

Figure 2B:
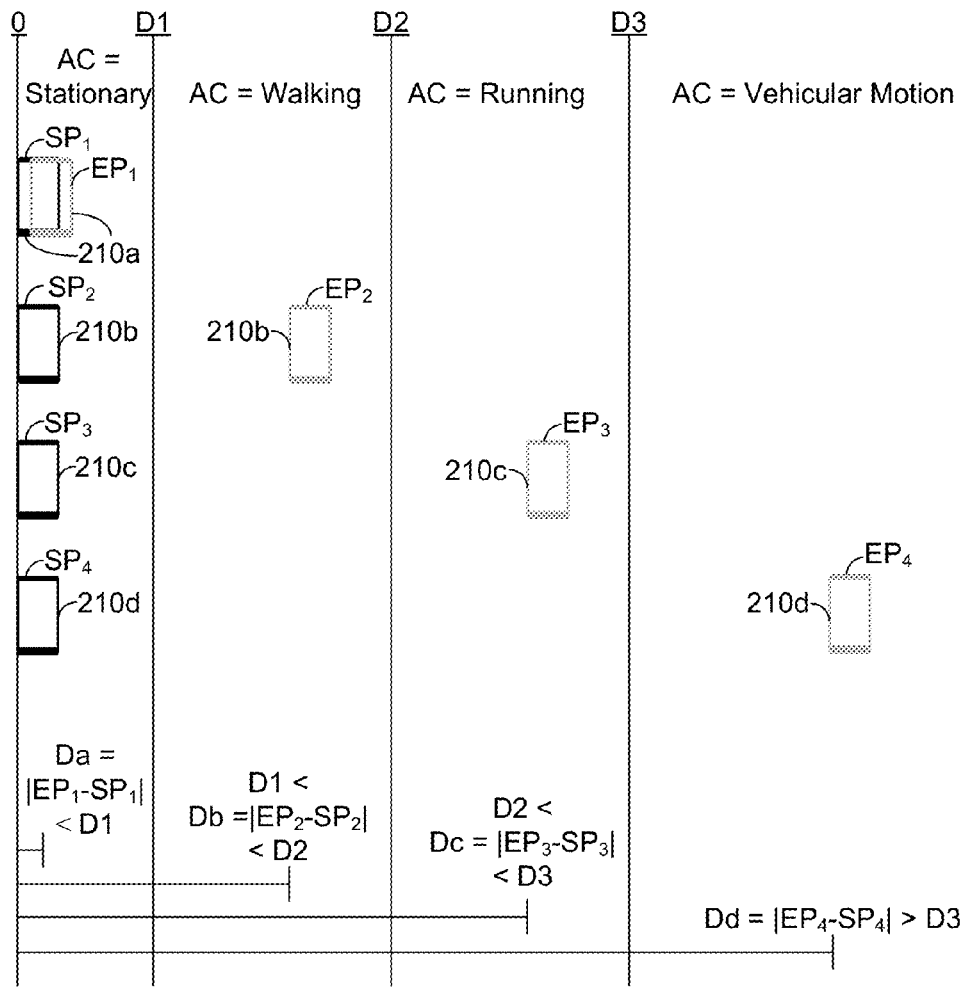
FIG. 2B depicts a scenario related to determining activity classes for a mobile device, in accordance with an example embodiment.

FIG. 2B depicts scenario 250 related to determining activity classes for a mobile device, such as mobile device 210, in accordance with an example embodiment. In scenario 250, mobile device 210 begins at a starting point (SP) shown as "0" in FIG. 2B in four example cases.

In a first example case, during a predetermined period of time PD, mobile device 210a moves a relatively-small amount from $SP_1$ to ending point (EP) $EP_1$, where a distance $Da=|SP_1-EP_1|$ is less than a predetermined distance D1. Then, as Da is less than D1, mobile device 210a can be determined to be (essentially) stationary, and so mobile device 210a can be assigned to a "stationary" activity class (AC) as shown in FIG. 2B.

In a second example case, mobile device 210b moves from $SP_2$ to $EP_2$ for a distance $Db=|SP_2-EP_2|$. As shown in FIG. 2B, Db is more than distance D1 and less than distance D2. As Db is between distances D1 and D2, mobile device 210b can be determined to be moving at a walking pace, and so mobile device 210b can be assigned to a "walking" activity class as shown in FIG. 2B.

In a third example case, mobile device 210c moves from $SP_3$ to $EP_3$ for a distance $Dc=|SP_3-EP_3|$. As shown in FIG. 2B, Dc is more than distance D2 and less than distance D3. As Dc is between distances D2 and D3, mobile device 210c can be determined to be moving at a running pace, and so mobile device 210c can be assigned to a "running" activity class as shown in FIG. 2B.

In a fourth example case, mobile device 210d moves from $SP_4$ to $EP_4$ for a distance $Dd=|SP_3—EP_3|$. As shown in FIG. 2B, Dd is more than distance D3. As Dd greater than distance D3, mobile device 210d can be determined to be moving at a pace that indicates vehicular motion, and so mobile device 210d can be assigned to a "vehicular motion" activity class as shown in FIG. 2B.

In some embodiments, PD can be one or a few seconds; e.g., five seconds. Then, when PD=5 seconds, D1 can be a relatively small distance; e.g., 3 feet, 1 meter. Then, in the example where D1 is 3 feet and PD=5 seconds, then D1/PD=3 ft./5 seconds≈0.4 miles per hour. As another example, for PD=5 seconds, D2 can equal≈30 feet (or approximately 4.1 miles per hour), and D3 can equal 75 feet (or approximately 10.2 miles per hour). Many other example time values, distance values, and activity classes are possible beyond the examples provided.

In other examples, velocity values can be used to determine activity classes. For example, using the example values above, velocities of a mobile device under approximately 0.4 miles per hour can indicate that the mobile device be assigned to the stationary activity class, velocities between 0.4 and 4.1 miles per hour indicate can indicate that the mobile device be assigned to the walking activity class, velocities between 4.1 and 10.2 miles per hour can indicate that the mobile device be assigned to the running activity class, and velocities greater than 10.2 miles per hour can indicate that the mobile device be assigned to the vehicular motion activity class.

Many other example time values, velocity values, and activity classes are possible beyond the examples provided. For example, activity classes based on a type of vehicular travel such as, but not limited to "public transport", "personal car", "aircraft", and "boating". In some embodiments, the activity class can be partially or completely specified by a user of the mobile device. For example, the user can indicate an activity of "resting" or "sleeping" which can partially correspond to an activity class of "stationary". In another example, the user can indicate travel in a particular vehicle; e.g. a bus, a personal car, an airplane, which can directly specify an activity class of "vehicular travel".

Mobile device 210 can use sensor data to confirm or reject a user-specified activity; e.g., if the user indicates travel in an airplane but mobile device 210 does not receive sensory data indicating movement (for at least a predetermined amount of time), the activity class for mobile device 210 can be set to "stationary". On the other hand, if the user indicates travel in an airplane and mobile device 210 detects movement of at a velocity higher than a predetermined amount (e.g., 100 miles per hour≈160 km per hour), then mobile device 210 can confirm the user indication of airplane travel and set the activity class to "vehicular travel" or, perhaps more specifically "aircraft". In yet another example, even if the user did not specify an activity, mobile device 210 can detect movement of at a velocity higher than the predetermined amount and set the activity class to "vehicular travel" or, perhaps more specifically "aircraft" using techniques similar to those mentioned above in determining other activity classes based on distance, time and/or velocity.

In some embodiments, distance and/or velocity values can be determined, respectively by single integration and double integration of acceleration values obtained from one or more accelerometers of mobile device 210.

Other techniques can be used to determine an activity class. For example, a pattern of acceleration values from an accelerometer of mobile device 210 that are all zero or nearly zero valued can indicate the velocity of mobile device 210 is constant. Then, upon determining motion is constant, a periodic check of location to determine that a location of mobile device 210 has remained unchanged during the period of constant velocity can indicate that the mobile device is stationary. Once the mobile device is determined to be stationary and so a velocity of mobile device 210 is (very nearly) zero, continued zero valued acceleration values indicate that velocity has not changed and so position has not changed. Thus, in some embodiments, only acceleration values, and not location or velocity values, need be observed after an initial determination that mobile device 210 is stationary. Another pattern of acceleration values can indicate rhythmic motion in the z-axis indicative of walking, or at higher speeds, of running Other examples are possible as well.

In some other embodiments, triangulation of network signals can be performed. For example, if mobile device 210 is receiving a signal from a known antenna for a wide-area wireless network and/or antenna, an estimated location of mobile device 210 can be determined to be within the reception area of the known base station or antenna. In some networks, mobile device 210 can determine which sector of a base station or antenna that the mobile device is located in. Further, in many, if not all networks, a mobile station, such as mobile device 210, receives signals from the strongest base station at that location, which may be the closest. Interpolation of additional signals from adjacent antenna(e) can be used improve estimates of the location of mobile device 210. In some scenarios, time of flight measurements can be taken for signals traveling between the mobile device and the base station or antenna, and the times of flight can be used to estimate distance between the mobile device and the base station or antenna.

In still other embodiments, a pattern of Wi-Fi, Bluetooth, Bluetooth low energy, and/or similar local wireless protocol stations accessible by mobile device 210 can be determined. Then, mobile device 210 has to be at a location where all of the coverage areas of the local wireless stations intersect. As local wireless stations are relatively short range, the intersection of two or more local wireless coverage areas is likely to occur within a relatively small area. Thus, an estimated location of mobile device 210 can be determined based on which local wireless stations are accessible by mobile device 210. Additional information, such as signal strength values from the local wireless stations and exact locations of the local wireless stations, can be used to increase accuracy of the estimated location of mobile device 210.

Other techniques can be used to locate and/or estimate a location of mobile device 210 as well; e.g., dead reckoning techniques, or techniques that track movement from a known starting location, laser location techniques, user input, textual processing of images, such as street signs.

Example Geofencing Scenarios

Figure 3A:
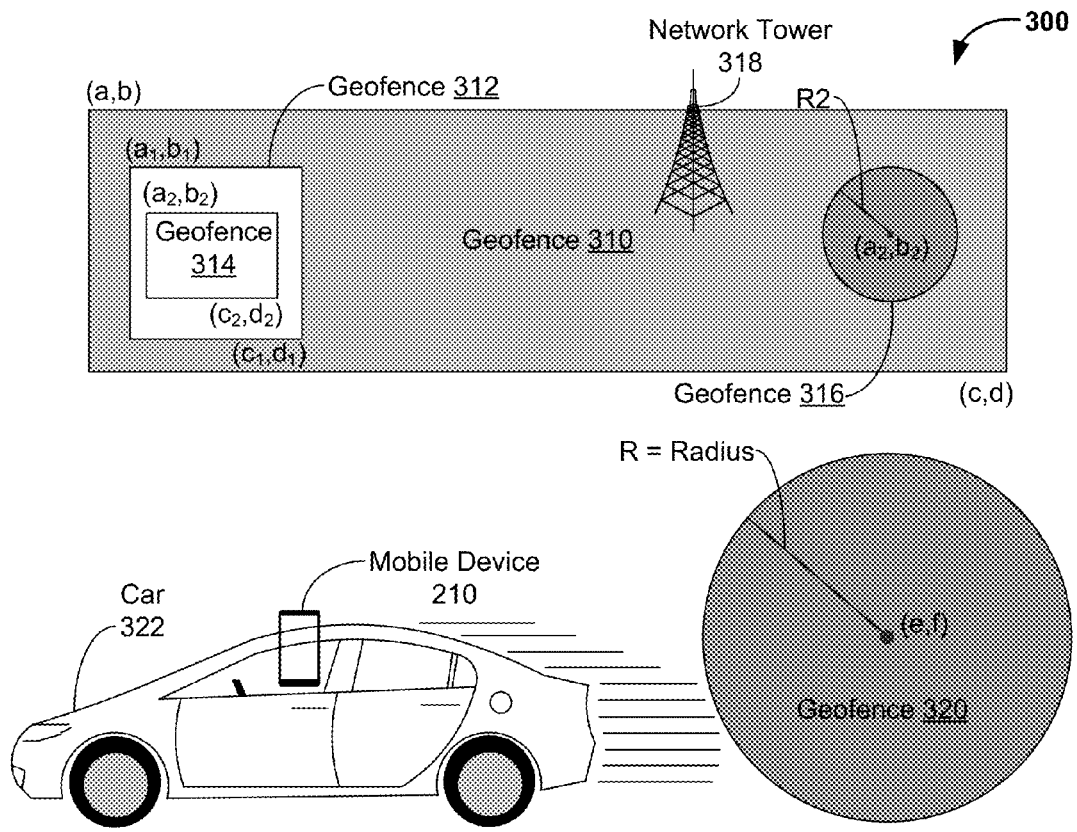
FIGS. 3A-3C depict a scenario related to applying geofencing-related heuristics for a mobile device, in accordance with an example embodiment.
Figure 3B:
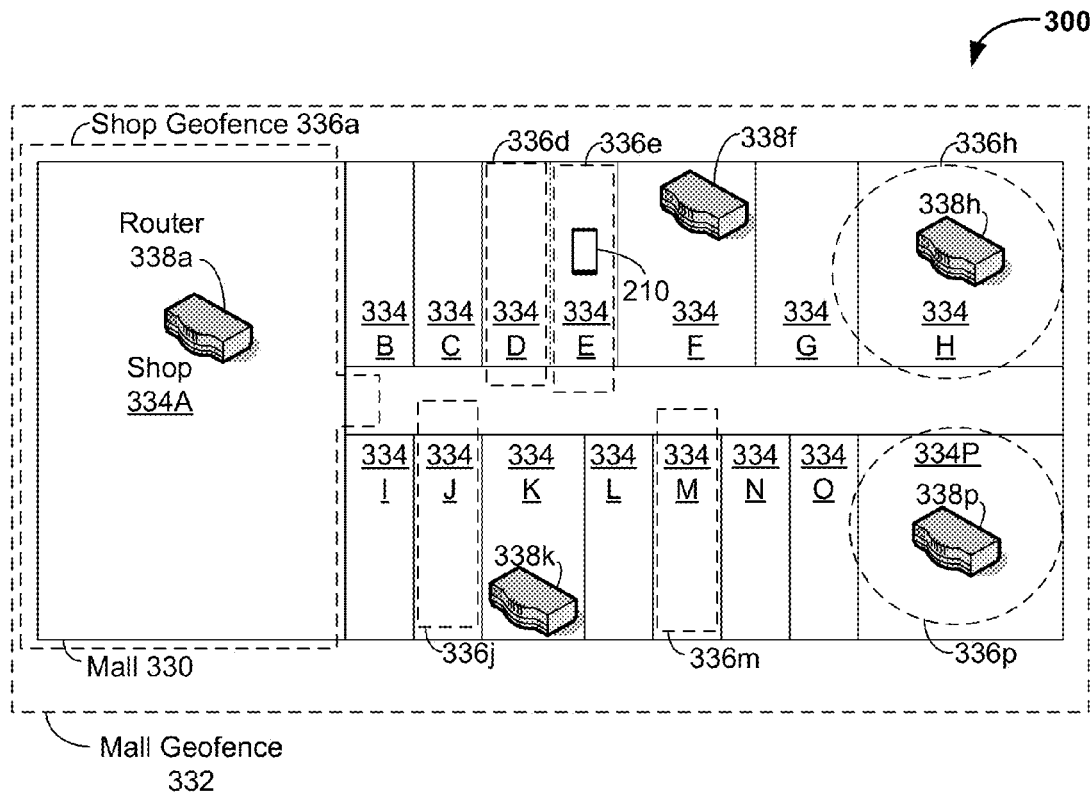
Figure 3C:
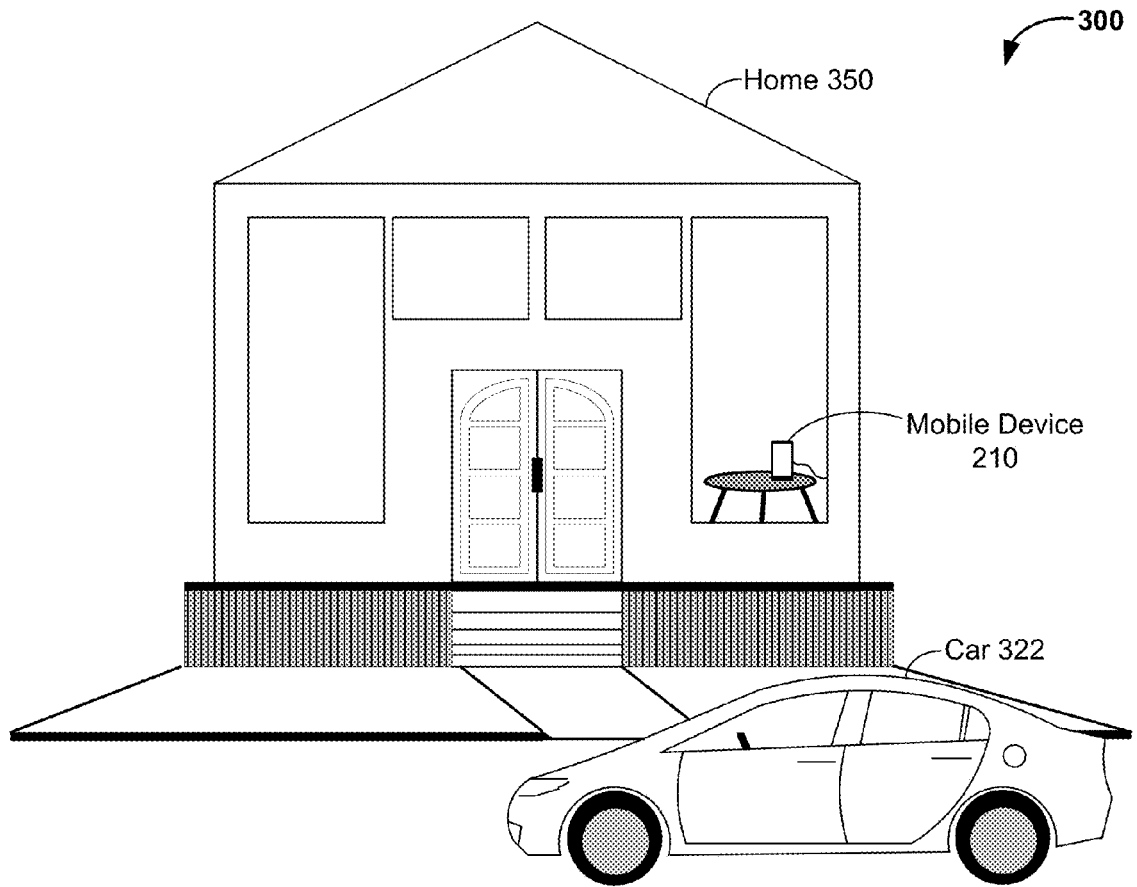

FIGS. 3A-3C depict scenario 300 related to applying geofencing-related heuristics for a mobile device, in accordance with an example embodiment. Scenario 300 begins at 300A, shown in FIG. 3A, with mobile device 210 traveling in car 322. Mobile device 210 is configured with one or more heuristics for controlling sensors of mobile device 210, where mobile device is configured with sensors that include accelerometers, location sensors (e.g., GPS sensors), signal-strength sensors for Wireless Wide Area Networks and Wireless Local Area Networks, and power/battery level sensors. In other scenarios, mobile device 210 can be configured with more, fewer, and/or different sensors.

In scenario 300, mobile device 210 is configured to receive a number of heuristic inputs and select a heuristic from among the one or more heuristics available to mobile device 210. At 300A of scenario 300, mobile device has been traveling in a vehicle for five minutes and is currently heading west near geofences 310, 312, 314, 316, and 320, and network tower 318. At 300A of scenario 300, mobile device 210 can receive heuristic inputs 324 shown in FIG. 3A: an activity class of "Vehicular Motion", an duration for the current activity class of five minutes (e.g., the activity class was set to "Vehicular Motion" five minutes ago), a direction of motion of "West", a number of nearby geofences of "5" with "3" authorized geofences, a direction to a nearest geofence of "300 m North East", a device power level of "40/100" (40%), and an indication of 1 radio network being available with a signal strength of 4 out of 6 possible.

In some embodiments, sensors can provide several types of inputs for use as heuristic inputs. One type of sensory input is data from measurements taken by the sensor; e.g., location values, velocity values, acceleration values, signal strengths, power levels. Another type of sensory input concerns reliability of data provided by the sensor; e.g., some sensors can provide data error rates and/or ranges of likely data values; e.g., an indication of a high (or low) error rate, a data value of 3.3±0.1 units, etc. As yet another example, information about the environment can be provided by the sensors; e.g., a GPS location device can inform mobile device 210 of a number of satellites detectable by the GPS location device. Other types of inputs can be provided by sensors as well.

In some embodiments, mobile device 210 can have at least two processors: an application processor providing computing resources to applications executing on the mobile device and a baseband processor providing computing resources to devices, such as sensors, receiving, sensing, and/or sending information for the mobile device. In specific embodiments, the baseband processor can always, or nearly always, be active; while the application processor can be active only when needed to provided computing resources for the applications executing on mobile device 210. In these embodiments, the application processor can sleep, or go inactive, when not being used by one or more applications, and the baseband processor can wake up, or activate, the application processor when data is available for the application processor from a device or devices.

In these embodiments, a geofencing application executing on the application processor of mobile device 210 can be used to generate geofencing messages; e.g., geofence entry message 240 and/or geofence exit message 244 discussed above in the context of at least FIG. 2A. In these embodiments, the above-mentioned sensors can be configured to be managed by the baseband processor. In particular of these embodiments, the geofencing application can receive measurements from the various sensors and run the heuristics in the application processor. In other particular embodiments, the heuristics can be executed in the baseband processor and the baseband processor can wake up the application processor to inform the geofencing application of the geofence transitions. Executing heuristics in the baseband processor can save power because the application processor can execute the geofencing application without being awakened for each sensor input. In still other particular of these embodiments, some, but not all, heuristic processing can use in the baseband processor and the remaining heuristic processing can use the application processor.

Mobile device 210 can use the activity class of Vehicular Motion to determine that mobile device 210 is moving at least a moderate rate of speed and is near five geofences, and so a location should be determined relatively frequently, the direction of motion and the nearest geofence information to indicate that mobile device 210 is moving away from the nearest geofences to indicate that the frequency of location determination may be reduced, and a device power level of 40% to determine that relatively low-power devices should be used to determine location information for geofencing.

Mobile device 210 can select a heuristic based on values of heuristic inputs 324; e.g., using Table 1 below.

TABLE 1

| | Example Heuristic Inputs | | | Heuristic Values (Outputs) | |
|---|---|---|---|---|---|
| Activity Class | # of Near Geofences | Power Level | Other Inputs | Location Accuracy | Location Frequency |
| Stationary | Few (e.g., less than 3) | n/a | Movement Sensors Available; nearest geofence is relatively far (greater than | n/a | Determine movement rather than location |

TABLE 1-continued

| | Example Heuristic Inputs | | | Heuristic Values (Outputs) | |
| --- | --- | --- | --- | --- | --- |
| Activity Class | # of Near Geofences | Power Level | Other Inputs | Location Accuracy | Location Frequency |
| Stationary | More than few | Greater than minimal (e.g., 10-20%) | Location Sensors Available and Location data reliable | Low (e.g., approximately ±100 meters) | Low (e.g., less than 5 times per minute) |
| Stationary | More than few | n/a | No Location Sensors Available or Unreliable location data (cannot find enough GPS satellites, high error rate, etc.) | Assuming movement determination requires less additional power than location determination, determine movement rather than location, if possible with available sensors. Otherwise, use most accurate location technique. | Low |
| Stationary | More than few | Minimal at most | n/a | Use best available location technique that preserves power; e.g., movement only, dead-reckoning, integration of accelerometer values, etc. | Low or, if power is below critical level (e.g., 5%), turn off geofencing |
| Walking | Few | Greater than minimal | Location sensors available and location data reliable. | Low, if moving away from nearest geofence. Medium, if no geofence within at least medium accuracy (e.g., ±50 meters) and not moving away from nearest geofence. High, if geofence closer than medium accuracy and not moving away from geofence | Low |
| Walking | More than few | Greater than minimal | Location sensors available and location data reliable. | Low to High - see immediately above | Low to medium, depending on power level distance to closest geofence, and direction of travel (toward or away from closest geofence) |
| Walking | More than few | n/a | No Location Sensors Available; Unreliable location data (cannot find enough GPS satellites, high error rate, etc.) | Use most accurate location technique with available sensors | Low to medium, depending on power level distance to closest geofence, and direction of travel |
| Walking | More than few | Minimal | n/a | Use location technique that preserves power with available sensors | Low or, if power is below critical level, turn off geofencing |
| Running | Few | Greater than minimal | Location sensors available and location data reliable. | Low, if moving away from nearest geofence. Medium, if no geofence within at least medium accuracy and not moving away from nearest geofence. High, if geofence closer than medium accuracy and not moving away from geofence | Low to medium, depending on power level distance to closest geofence, and direction of travel |

TABLE 1-continued

| | Example Heuristic Inputs | | | Heuristic Values (Outputs) | |
|---|---|---|---|---|---|
| Activity Class | # of Near Geofences | Power Level | Other Inputs | Location Accuracy | Location Frequency |
| Running | More than few | Greater than minimal | Location sensors available and location data reliable. | Low to High - see immediately above. | Medium to high, depending on power level distance to closest geofence, and direction of travel |
| Running | More than few | n/a | No Location Sensors Available; Unreliable location data (cannot find enough GPS satellites, high error rate, etc.) | Use most accurate location technique with available sensors | Low to medium, depending on power level distance to closest geofence, and direction of travel |
| Running | More than few | Minimal | n/a | Use location technique that preserves power with available sensors | Medium or, if power is below critical level, turn off geofencing |
| Vehicular Motion | Few | Greater than minimal | Location sensors available and location data reliable. | Low, if moving away from nearest geofence. Medium, if no geofence within at least medium accuracy and not moving away from nearest geofence. High, if geofence closer than medium accuracy and not moving away from geofence | At least medium, depending on power level distance to closest geofence, and direction of travel |
| Vehicular Motion | More than few | Greater than minimal | Location sensors available and location data reliable. | Low to High - see immediately above | High |
| Vehicular Motion | More than few | n/a | No Location Sensors Available; Location sensors report unreliable (cannot find satellites, high error rate, etc.) | Use most accurate location technique with available sensors | Medium to high, depending on power level distance to closest geofence, and direction of travel |
| Vehicular Motion | More than few | Minimal | n/a | Use location technique that preserves power with available sensors | High or, if power is below critical level, turn off geofencing |

Determination of "best available" techniques as indicated in Table 1 above can be performed before first use of mobile device 210; e.g., by manufacturer testing of location techniques and sensors for accuracy, power use, and/or other factors (e.g., sensor reliability). Choices of specific values for the general values; e.g., "low", "medium", etc., can be made as part of heuristic selection and/or heuristic development. A large number of other choices of example values, heuristic inputs, and heuristic outputs are possible instead of and/or rather than the choices illustrated in Table 1 above. Additionally, many other choices of heuristics than those listed in Table 1 above are possible as well, depending on, for example, a device used for mobile device 210, sensors available for use on mobile device 210, choices in activity class values, choices in other heuristic inputs, number(s) and location(s) of geofences, and other considerations.

In this example, mobile device 210 can then select a heuristic 326 that determines location using low power/accuracy sensors since the power level is relatively low and since mobile device 210 is moving away from at least the closest geofence. Heuristic 326 also indicates that the location of mobile device 210 is to be determined relatively frequently, due to the nearness of the geofences and the activity class of the mobile device indicating mobile device 210 is moving at least a moderate rate of speed.

Once selected, heuristic 326 can deactivate relatively-high-power location sensors; e.g., a GPS sensors, and at least some relatively-moderate and relatively-low power sensors of mobile device 210, since low power and low location accuracy is requested. Further, heuristic 326 can update a location of mobile device 210 relatively frequently; e.g., once every second or every few seconds. In some embodiments, the heuristic inputs can be updated periodically and a heuristic determined after updating the heuristic updates. For example, the heuristic inputs can be updated at the same frequency or a proportional frequency to the frequency of location determinations. In other embodiments, heuristic 326 can be determined at run time; e.g., mobile device 210 can select which sensors are to be powered on and/or powered off, and a frequency of location determination based on heuristic inputs; e.g., heuristic inputs 326.

In FIG. 3B, scenario 300 at 300B shows that mobile device 210 is now within mall 330, which is surrounded by mall geofence 332. FIG. 3B shows mall 330 with sixteen shops inside: 334A, 334B, 334C, 334D, 334E, 334F, 334G, 334H, 334I, 334J, 334K, 334L, 334M, 334N, 334O, and 334P. Mall 330 includes geofences 336a, 336d, 336e, 336h, 336j, 336m, and 336p for respective shops 334A, 334D, 334E, 334H, 334J, 334M, and 336P. FIG. 3B also shows that shops 334A, 334F, 334H, 334P, and 334K have respective Wi-Fi routers 338a, 338f, 338h, 338k, and 338p.

At 300B, mobile device 210 is within shop 334E and within mall geofence 332 and shop geofence 336e, and can receive signals from each of Wi-Fi routers 338a, 338f, 338h, 338k, and 338p. Then, at 300B of scenario 300, mobile device 210 can receive heuristic inputs 340 shown in FIG. 3B as: an activity class of "Walking", an duration for the current activity class of two minutes, a direction of motion of "South", a number of nearby geofences of "8" with "7" authorized geofences, an indication that mobile device is already "Inside two" geofences with a direction to a nearest geofence of "8 m West", a device power level of "38/100" (38%), and an indication of 6 radio networks being available with relative signal strengths of 4 out of 6, 4 out of 5, 4 out of 5, 2 out of 5, 1 out of 5, and 1 out of 5.

Mobile device 210 can use the activity class of walking to determine that mobile device is moving at a relatively low speed, and so a location should be determined relatively infrequently, but is within two geofences and only eight meters from a nearest geofence, so the frequency of location determination should increase. Also, since the nearest geofence is relatively near, the location should be determined relatively accurately even though the device power level of 38% is relatively low. In other scenarios where a power level of mobile device 210 is below a threshold level (e.g., 10% or 15%), a heuristic can be used that selects low power location sensors may be used even when very near geofences to preserve power. In still other scenarios where a power level of mobile device 210 is below the threshold level, a heuristic can then be selected that stops all location determinations strictly for geofencing until power levels increase; i.e., stops geofencing in low power/battery situations until mobile device 210 is charging.

Mobile device 210 can then select a heuristic 342 that determines location using high power/accuracy location sensors since there are many nearby geofences and at least one is very close (within eight meters at 300B), while there is still some power to drive the high power/accuracy location sensors. Heuristic 342 also indicates that the location of mobile device 210 is to be determined with a medium frequency, which is increased somewhat from a baseline case for an activity class of Walking, due to the nearness and number of the geofences about mobile device 210.

Scenario 300 continues at 300C, shown in FIG. 3C, with mobile device 210 sitting stationary at home 350 while being charged. No geofences are nearby, but mobile device 210 can detect signals from one Wireless Wide Area Network and two Wireless Local Area Networks.

At 300C of scenario 300, mobile device 210 can receive heuristic inputs 360 shown in FIG. 3C: an activity class of "Stationary", an duration for the current activity class of "22" minutes, a direction of motion of "n/a" (not applicable), a number of nearby geofences of "0", a direction to a nearest geofence of "n/a", a device power level of "78/100" (78%), and an indication of three radio networks being available with respective signal strengths of 5 out of 6, 5 out of 5, and 2 out of 5.

Mobile device 210 can use the activity class of Stationary to determine that mobile device 210 is not moving, and also is not near any geofences, and so a location should be determined relatively infrequently if at all. Rather, mobile device 210 can detect movement rather than location; as mobile device 210 can only change location if moved. Mobile device 210 can then select a heuristic 362 that does not determine movement but rather determines movement at a low frequency. In some embodiments, heuristic 362 can be informed that a mobile device, such as a stationary mobile device, has moved rather than check for movement periodically.

In other embodiments, heuristic 362 can determine if a stationary mobile device 210 has moved at a velocity higher than a threshold velocity, exceeded the threshold velocity for at least a threshold amount of time, (e.g., more than 1 foot/minute for at least one second) and/or has moved more than a threshold distance. If mobile device 210 has exceeded the threshold velocity, exceeded the threshold velocity for at least a threshold amount of time, and/or moved more than a threshold distance, then mobile device can be considered as no longer stationary (i.e., the activity class of stationary for mobile device 210 can be out-of-date), and so new heuristic inputs 360 can be determined and/or new heuristic 362 can be selected.

Example Data Network

Figure 4:
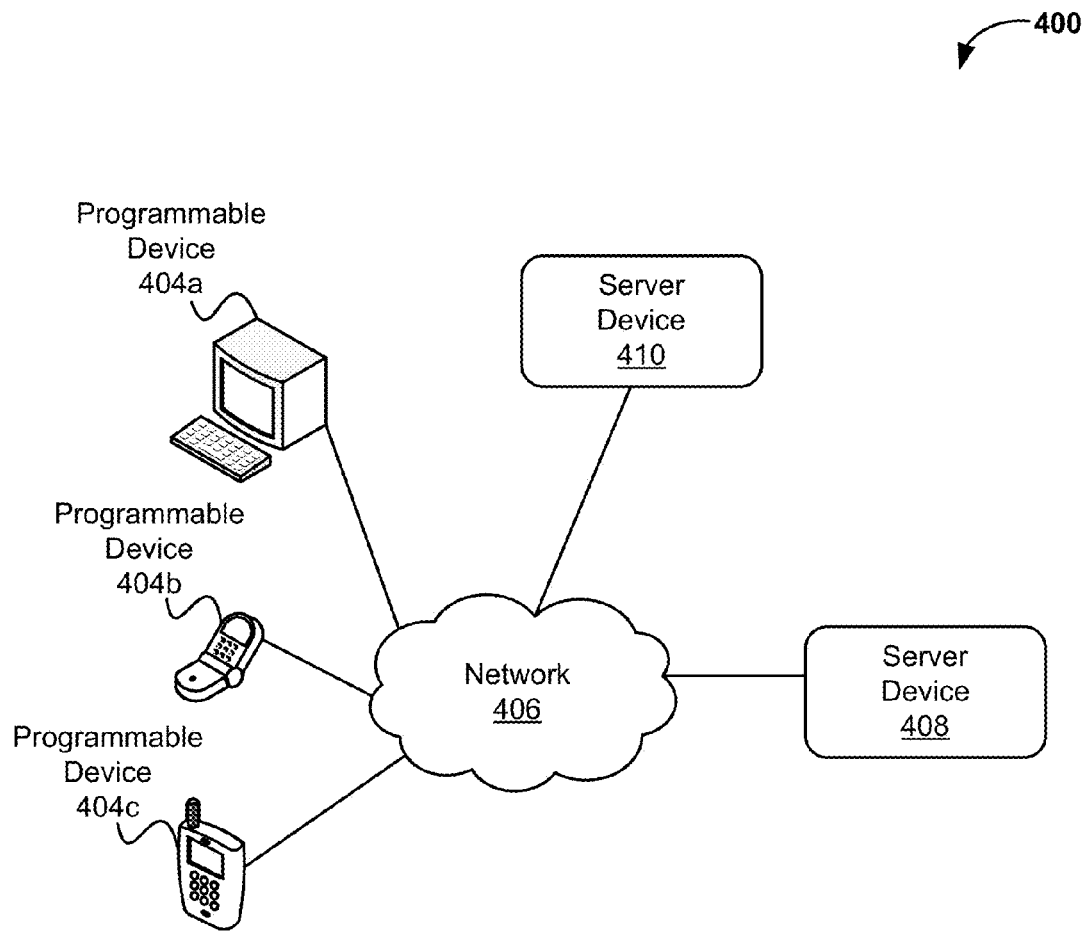
FIG. 4 depicts a distributed computing architecture, in accordance with an example embodiment.

FIG. 4 depicts a distributed computing architecture 400 with server devices 408, 410 configured to communicate, via network 406, with programmable devices 404a, 404b, and 404c, in accordance with an example embodiment. Network 406 may correspond to a LAN, a wide area network (WAN), a corporate intranet, the public Internet, or any other type of network configured to provide a communications path between networked computing devices. The network 406 may also correspond to a combination of one or more LANs, WANs, corporate intranets, and/or the public Internet.

Although FIG. 4 only shows three programmable devices, distributed application architectures may serve tens, hundreds, or thousands of programmable devices. Moreover, programmable devices 404a, 404b, and 404c (or any additional programmable devices) may be any sort of computing device, such as an ordinary laptop computer, desktop computer, network terminal, wireless communication device (e.g., a cell phone or smart phone), and so on. In some embodiments, programmable devices 404a, 404b, and 404c may be dedicated to the design and use of software applications. In other embodiments, programmable devices 404a, 404b, and 404c may be general purpose computers that are configured to perform a number of tasks and need not be dedicated to software development tools. In particular embodiments, the functionality of mobile device 210 can be performed by one or more of programmable devices 404a, 404b, and 404c.

Server devices 408, 410 can be configured to perform one or more services, as requested by programmable devices 404a, 404b, and/or 404c. For example, server device 408 and/or 410 can provide content to programmable devices 404a-404c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 408 and/or 410 can provide programmable devices 404a-404c with access to software for database, search, computation, graphical, audio, video, World Wide Web/Internet utilization, and/or other functions. Many other examples of server devices are possible as well.

Computing Device Architecture

Figure 5A:
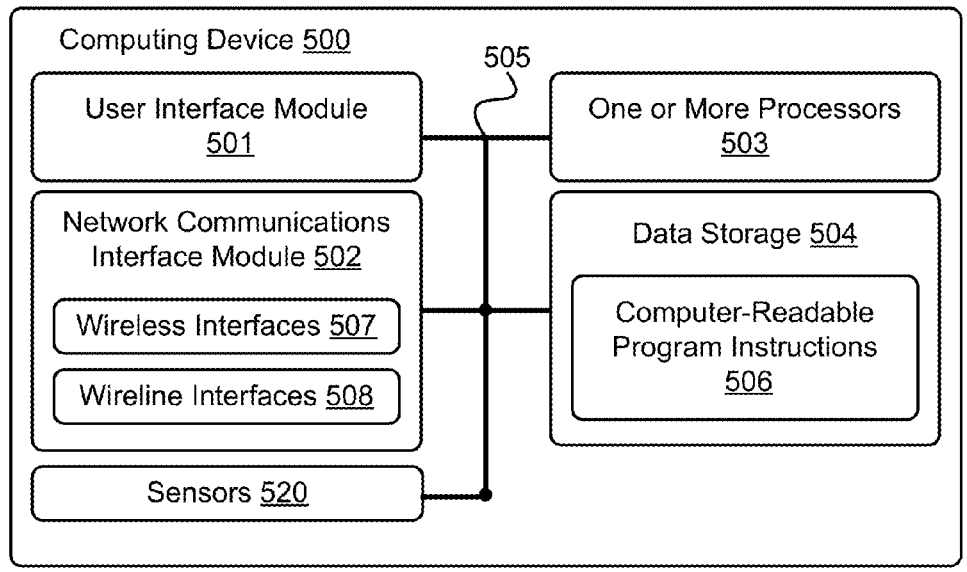
FIG. 5A is a block diagram of a computing device, in accordance with an example embodiment.

FIG. 5A is a block diagram of a computing device 500 (e.g., system) in accordance with an example embodiment. In particular, computing device 500 shown in FIG. 5A can be configured to perform one or more functions of mobile device 210, server devices 408, 410, network 406, and/or one or more of programmable devices 404a, 404b, and 404c. Computing device 500 may include a user interface module 501, a network-communication interface module 502, one or more processors 503, data storage 504, and sensors 520, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a computer mouse, a track ball, a joystick, a camera, a voice recognition module, and/or other similar devices. User interface module 501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices.

Network-communications interface module 502 can include one or more wireless interfaces 507 and/or one or more wireline interfaces 508 that are configurable to communicate via a network, such as network 406 shown in FIG. 4. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 503 can include one or more general purpose processors and/or one or more special purpose processors (e.g., digital signal processors, application specific integrated circuits, etc.). Processors 503 can be configured to execute computer-readable program instructions 506a that are contained in the data storage 504 and/or other instructions as described herein.

Data storage 504 can include one or more computer-readable storage media that can be read and/or accessed by at least one of processors 503. The one or more computer-readable storage media can include volatile and/or non-volatile storage components, such as optical, magnetic, organic or other memory or disc storage, which can be integrated in whole or in part with at least one of processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data, such as but not limited to data used by one or more processes and/or threads of a software application. In some embodiments, data storage 504 can additionally include storage required to perform at least part of the herein-described methods and techniques and/or at least part of the functionality of the herein-described devices and networks.

Sensors 520 can be configured to measure conditions in an environment for computing device 500 and provide data about that environment. The data can include, but is not limited to, location data about computing device 500, velocity (speed, direction) data about computing device 500, acceleration data about computing device, and other data about the environment for computing device 500. Sensors 520 can include, but are not limited to, GPS sensor(s), location sensors(s), proximity sensor(s), gyroscope(s), accelerometer(s), magnetometer(s), camera(s), light sensor(s), infrared sensor(s), and microphone(s).

Other components of computing device 500 can provide data about the environment of computing device 500 as well. For example, wireline interfaces 507 and wireless interfaces 508 can provide information about networks that are accessible and/or accessed by computing device 500, as well as other environmental information (e.g., weather information). As another example, user interface 501 can request and receive data from a user of computing device 500. Other examples are possible as well.

Some or all of sensors 520, as well as other components of computing device 500, can be controlled by the herein-described heuristics related to geofences. For example, a heuristic can control sensors 520 and other components by sending commands, such as, but not limited to commands for: activating sensor(s)/component(s), deactivating sensor(s)/component(s), periodically activating or deactivating sensor(s)/component(s), obtaining data from and/or providing data to sensor(s)/component(s), and adjusting controls, parameters, and/or other values of sensor(s)/component(s). For some or all of these commands, sensors 520 and other components of computing device 500 can provide responses, such as, but not limited to: data, measurement information, failure/success information, exception data, debugging information, and other responses.

Cloud-Based Servers

Figure 5B:
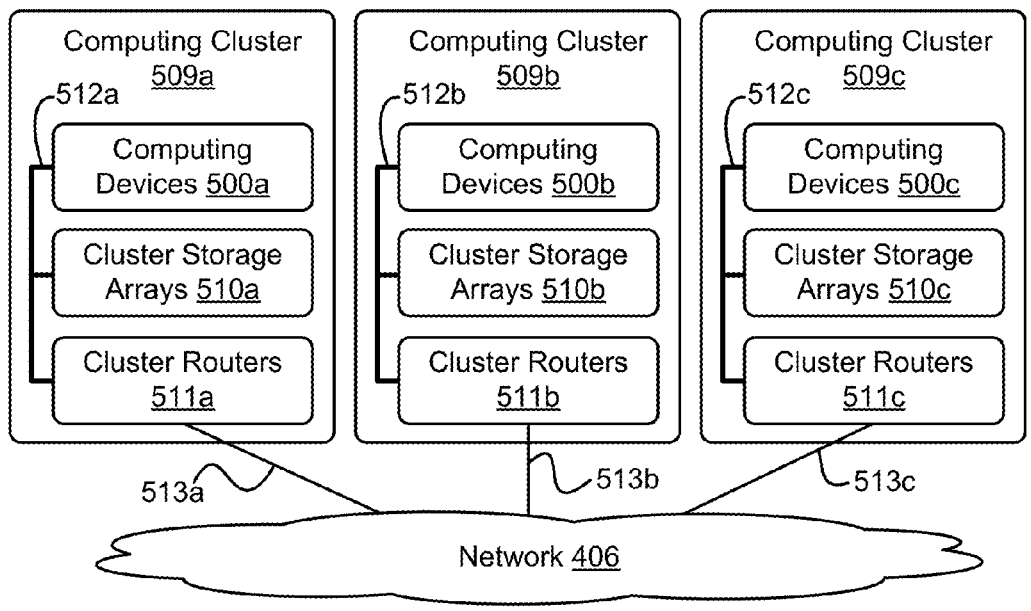
FIG. 5B depicts a cloud-based server system, in accordance with an example embodiment.

FIG. 5B depicts network 406 of computing clusters 509a, 509b, 509c arranged as a cloud-based server system in accordance with an example embodiment. Server devices 408 and/or 410 can be cloud-based devices that store program logic and/or data of cloud-based applications and/or services. In some embodiments, server devices 408 and/or 410 can be a single computing device residing in a single computing center. In other embodiments, server device 408 and/or 410 can include multiple computing devices in a single computing center, or even multiple computing devices located in multiple computing centers located in diverse geographic locations. For example, FIG. 4 depicts each of server devices 408 and 410 residing in different physical locations.

In some embodiments, data and services at server devices 408 and/or 410 can be encoded as computer readable information stored in non-transitory, tangible computer readable media (or computer readable storage media) and accessible by programmable devices 404a, 404b, and 404c, and/or other computing devices. In some embodiments, data at server device 408 and/or 410 can be stored on a single disk drive or other tangible storage media, or can be implemented on multiple disk drives or other tangible storage media located at one or more diverse geographic locations.

FIG. 5B depicts a cloud-based server system in accordance with an example embodiment. In FIG. 5B, the functions of server device 408 and/or 410 can be distributed among three computing clusters 509a, 509b, and 508c. Computing cluster 509a can include one or more computing devices 500a, cluster storage arrays 510a, and cluster routers 511a connected by a local cluster network 512a. Similarly, computing cluster 509b can include one or more computing devices 500b, cluster storage arrays 510b, and cluster routers 511b connected by a local cluster network 512b. Likewise, computing cluster 509c can include one or more computing devices 500c, cluster storage arrays 510c, and cluster routers 511c connected by a local cluster network 512c.

In some embodiments, each of the computing clusters 509a, 509b, and 509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 509a, for example, computing devices 500a can be configured to perform various computing tasks of server 408. In one embodiment, the various functionalities of server 408 can be distributed among one or more of computing devices 500a, 500b, and 500c. Computing devices 500b and 500c in computing clusters 509b and 509c can be configured similarly to computing devices 500a in computing cluster 509a. On the other hand, in some embodiments, computing devices 500a, 500b, and 500c can be configured to perform different functions.

In some embodiments, computing tasks and stored data associated with server devices 408 and/or 410 can be distributed across computing devices 500a, 500b, and 500c based at least in part on the processing requirements of server devices 408 and/or 410, the processing capabilities of computing devices 500a, 500b, and 500c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 510a, 510b, and 510c of the computing clusters 509a, 509b, and 509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 408 and/or 410 can be distributed across computing devices 500a, 500b, and 500c of computing clusters 509a, 509b, and 509c, various active portions and/or backup portions of these components can be distributed across cluster storage arrays 510a, 510b, and 510c. For example, some cluster storage arrays can be configured to store the data of server device 408, while other cluster storage arrays can store data of server device 410. Additionally, some cluster storage arrays can be configured to store backup versions of data stored in other cluster storage arrays.

The cluster routers 511a, 511b, and 511c in computing clusters 509a, 509b, and 509c can include networking equipment configured to provide internal and external communications for the computing clusters. For example, the cluster routers 511a in computing cluster 509a can include one or more internet switching and routing devices configured to provide (i) local area network communications between the computing devices 500a and the cluster storage arrays 501a via the local cluster network 512a, and (ii) wide area network communications between the computing cluster 509a and the computing clusters 509b and 509c via the wide area network connection 513a to network 406. Cluster routers 511b and 511c can include network equipment similar to the cluster routers 511a, and cluster routers 511b and 511c can perform similar networking functions for computing clusters 509b and 509b that cluster routers 511a perform for computing cluster 509a.

In some embodiments, the configuration of the cluster routers 511a, 511b, and 511c can be based at least in part on the data communication requirements of the computing devices and cluster storage arrays, the data communications capabilities of the network equipment in the cluster routers 511a, 511b, and 511c, the latency and throughput of local networks 512a, 512b, 512c, the latency, throughput, and cost of wide area network links 513a, 513b, and 513c, and/or other factors that can contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving a plurality of heuristics at a computing device having a plurality of sensors that include a location sensor and a network-signal receiver, wherein each heuristic of the plurality of heuristics is configured to receive one or more heuristic inputs;
   receiving a plurality of signals from the plurality of sensors of the computing device;
   determining, based on the plurality of signals, an activity class using the computing device, wherein the activity class specifies an activity associated with the computing device;
   selecting a heuristic from the plurality of heuristics at least based on the activity class using the computing device; and
   executing, by the computing device, the selected heuristic to generate one or more commands to one or more sensors of the plurality of sensors using the one or more heuristic inputs, wherein the one or more heuristic inputs comprise an input related to a geofence and one or more signal-strength values associated with the computing device received as input from the network-signal receiver, wherein the one or more commands comprise a command to deactivate the location sensor, and wherein the selected heuristic determines an output specifying a frequency for determining a location of the computing device.

2. The method of claim 1, wherein the selected heuristic further determines an output specifying an accuracy of a sensor used to in determining the location of the computing device.

3. The method of claim 1, wherein the one or more heuristic inputs further comprise one or more locations associated with the computing device received as input from the location sensor.

4. The method of claim 1, wherein the one or more heuristic inputs comprise one or more locations associated with the computing device, and wherein determining the activity class for the computing device comprises determining the activity class for the computing device based on the one or more locations.

5. The method of claim 4, wherein the one or more heuristic inputs further comprise one or more velocities associated with the computing device, and wherein determining the activity class for the computing device comprises determining the activity class for the computing device based on the one or more locations and the one or more velocities.

6. The method of claim 5, wherein the one or more locations associated with the computing device comprise a first location and wherein determining the activity class for the computing device comprises determining that the activity class for the computing device is a stationary activity class when each of one or more locations differs from the first location by less than a first predetermined distance for at least a first duration of time.

7. The method of claim 6, wherein determining the activity class for the computing device further comprises determining that the activity class for the computing device is a walking activity class when at least some of one or more locations differ from the first location by more than the first predetermined distance but less than a second predetermined distance during at least the first duration of time.

8. The method of claim 7, wherein executing the selected heuristic to generate the one or more commands to the one or more sensors comprises:
   determining whether the activity class is the stationary activity class; and
   after determining that the activity class is the stationary activity class, generating the command to deactivate the location sensor.

9. The method of claim 7, wherein executing the selected heuristic to generate the one or more commands to the one or more sensors comprises:
   determining whether the activity class is the walking activity class; and
   after determining that the activity class is the walking activity class, generating a command to activate the location sensor.

10. The method of claim 5, wherein the one or more velocities associated with the computing device comprise a first velocity and wherein determining the activity class for the computing device comprises determining that the activity class for the computing device is a stationary activity class when an absolute value of each of the one or more velocities is less than a first predetermined velocity for at least a first duration of time.

11. The method of claim 10, wherein determining the activity class for the computing device comprises determining that the activity class for the computing device is a walking activity class when at least one of the one or more velocities is greater than the first predetermined velocity and less than a second predetermined velocity during the first duration of time and wherein the second predetermined velocity exceeds the first predetermined velocity.

12. A computing device, comprising:
a plurality of sensors, comprising a location sensor and a network-signal receiver;
a processor; and
a non-transitory computer-readable storage medium having stored thereon program instructions that, upon execution by the processor, cause the computing device to perform functions comprising:
receiving a plurality of heuristics, wherein each heuristic of the plurality of heuristics is configured to generate one or more commands to receive one or more heuristic inputs,
receiving a plurality of signals from the plurality of sensors,
determining, based on the plurality of signals, an activity class, wherein the activity class specifies an activity associated with the computing device,
selecting a heuristic from the plurality of heuristics at least based on the activity class, and
executing the selected heuristic to generate one or more commands to one or more sensors of the plurality of sensors using the one or more heuristic inputs, wherein the one or more heuristic inputs comprise an input related to a geofence and one or more signal-strength values associated with the computing device received as input from the network-signal receiver, wherein the one or more commands comprise a command to deactivate the location sensor, and wherein the selected heuristic determines an output specifying a frequency for determining a location of the computing device.

13. The computing device of claim 12, wherein the one or more heuristic inputs further comprise one or more locations associated with the computing device received as input from the location sensor.

14. The computing device of claim 13, wherein determining the activity class for the computing device comprises determining the activity class for the computing device based on the one or more locations.

15. The computing device of claim 14, wherein the one or more locations associated with the computing device comprise a first location and wherein determining the activity class for the computing device comprises determining that the activity class for the computing device is a stationary activity class when each of one or more locations differs from the first location by less than a first predetermined distance for at least a first duration of time.

16. The computing device of claim 15, wherein executing the selected heuristic to generate the one or more commands to the one or more sensors comprises:
determining whether the activity class is the stationary activity class; and
after determining that the activity class is the stationary activity class, generating the command to deactivate the location sensor.

17. The computing device of claim 12, wherein the processor comprises an application processor and a baseband processor, wherein the application processor is configured to execute at least a geofencing application, wherein the baseband processor is configured to manage the plurality of sensors, and wherein executing the selected heuristic to generate the one or more commands to the one or more sensors comprises executing the selected heuristic using the baseband processor.

18. The computing device of claim 17, wherein executing the selected heuristic to generate the one or more commands to the one or more sensors comprises executing the selected heuristic for the geofencing application using the application processor.

19. An apparatus, including a non-transitory computer-readable storage medium having stored thereon program instructions that, upon execution by a computing device, cause the apparatus to perform functions comprising:
receiving a plurality of heuristics, wherein the apparatus has a plurality of sensors that include a location sensor and a network-signal receiver, wherein each heuristic of the plurality of heuristics is configured to receive one or more heuristic inputs;
receiving a plurality of signals from the plurality of sensors;
determining, based on the plurality of signals, an activity class, wherein the activity class specifies an activity associated with the apparatus;
selecting a heuristic from the plurality of heuristics at least based on the activity class; and
executing the selected heuristic to generate one or more commands to one or more sensors of the plurality of sensors using the one or more heuristic inputs, wherein the one or more heuristic inputs comprise an input related to a geofence and one or more signal-strength values associated with the computing device received as input from the network-signal receiver, wherein the one or more commands comprise a command to deactivate the location sensor, and wherein the selected heuristic determines an output specifying a frequency for determining a location of the computing device.

20. The apparatus of claim 19, wherein the one or more heuristic inputs comprise one or more locations associated with the computing device received as input from the location sensor, and wherein determining the activity class for the computing device comprises determining the activity class for the computing device based on the one or more locations.

* * * * *